United States Patent
Holloway et al.

[19]

[11] Patent Number: 5,905,859
[45] Date of Patent: May 18, 1999

[54] MANAGED NETWORK DEVICE SECURITY METHOD AND APPARATUS

[75] Inventors: Malcolm H. Holloway, Durham; Thomas Joseph Prorock, Raleigh, both of N.C.

[73] Assignee: International Business Machines Corporation, Armonk, N.Y.

[21] Appl. No.: 08/775,536

[22] Filed: Jan. 9, 1997

[51] Int. Cl.⁶ .................................................. G06F 11/00
[52] U.S. Cl. ...................................................... 395/187.01
[58] Field of Search ............................. 395/187.01, 186, 395/185.09, 200.53, 200.54, 200.59, 200.55; 380/3, 25

[56] References Cited

U.S. PATENT DOCUMENTS

| | | | |
|---|---|---|---|
| 4,930,159 | 5/1990 | Kravitz et al. | 380/23 |
| 5,177,788 | 1/1993 | Schanning et al. | 380/23 |
| 5,305,385 | 4/1994 | Schanning et al. | 380/49 |
| 5,311,593 | 5/1994 | Carmi | 380/23 |
| 5,337,309 | 8/1994 | Faulk, Jr. | 370/60 |
| 5,414,833 | 5/1995 | Hershey et al. | 395/575 |
| 5,421,024 | 5/1995 | Faulk, Jr. et al. | 395/800 |
| 5,440,723 | 8/1995 | Arnold et al. | 395/183.14 |
| 5,495,580 | 2/1996 | Osman | 395/187.01 |
| 5,537,099 | 7/1996 | Liang | 340/825.07 |
| 5,606,668 | 2/1997 | Shwed | 395/187.01 |
| 5,615,340 | 3/1997 | Dai et al. | 395/187.01 |
| 5,727,146 | 3/1998 | Savoldi et al. | 395/187.01 |

*Primary Examiner*—Robert W. Beausoliel, Jr.
*Assistant Examiner*—Scott T. Baderman
*Attorney, Agent, or Firm*—John J. Timar

[57] ABSTRACT

An apparatus and method for providing security against intrusion in the managed devices of a campus LAN network is provided. A managed hub discovers each interconnect device in the network that supports the security feature and maintains an interconnect device list of such devices, which may include token ring switches, Ethernet switches, bridges and routers. The managed hub detects an intrusion by an unauthorized address on one of its ports and notifies the interconnect devices of the intrusion by transmitting a security breach detected frame. After each interconnect device sets a filter on its respective ports against the intruding unauthorized address and sends a filter set frame to the managed hub, the port in the managed hub where the security intrusion occurred is reenabled.

35 Claims, 15 Drawing Sheets

DISCOVERY REQUEST

DISCOVERY RESPONSE

SECURITY BREACH DETECTED FRAME

FILTER SET FRAME

SECURITY CLEAR CONDITION

| INTERCONNECT DEVICE LIST ITEM ||||
|---|---|---|---|
| MAC ADDRESS | DEVICE DESCRIPTION | LAST RESPONSE TIME | OUTSTANDING BREACH RESPONSE COUNT |

MAC ADDRESS: MAC ADDRESS OF THE INTERCONNECT DEVICE

DEVICE DESCRIPTION: ASCII SELF DESCRIPTION PROVIDED BY THE INTERCONNECT DEVICE

LAST RESPONSE TIME: TIME WHEN LAST RESPONSE RECEIVED FROM INTERCONNECT DEVICE

OUTSTANDING BREACH RESPONSE COUNT: NUMBER OF SECURITY BREACH FRAMES THE INTERCONNECT DEVICE HAS NOT RESPONDED TO

FIG. 6

| BREACH LIST ITEM |||||
|---|---|---|---|---|
| MAC ADDRESS | BREACH TIME | BREACH PORT | BREACH MODULE | OUTSTANDING FILTER SET COUNT |

MAC ADDRESS: MAC ADDRESS OF THE INTRUDING DEVICE

BREACH TIME: TIME WHEN INTRUSION OCCURRED

BREACH PORT: PORT IN MANAGED HUB WHEN INTRUSION OCCURRED

BREACH MODULE: MODULE IN MANAGED HUB WHEN INTRUSION OCCURRED

OUTSTANDING FILTER SET COUNT: NUMBER OF FILTER SET FRAMES NOT RECEIVED YET

FIG. 7

| INTRUSION LIST ITEM ||||
|---|---|---|---|
| MAC ADDRESS | BREACH TIME | BREACH PORT | BREACH MODULE |

MAC ADDRESS: MAC ADDRESS OF THE INTRUDING DEVICE

BREACH TIME: TIME WHEN INTRUSION OCCURRED

BREACH PORT: PORT IN MANAGED HUB WHEN INTRUSION OCCURRED

BREACH MODULE: MODULE IN MANAGED HUB WHEN INTRUSION OCCURRED

FIG. 8

MANAGED NETWORK DEVICE SECURITY METHOD AND APPARATUS

Reference to Related Application

This application is related to the following application having the same assignee and inventorship and containing common disclosure, and is believed to have an identical effective filing date: "System and Method for Detecting and Preventing Security Intrusions in Campus LAN Networks", Ser. No. 08/780804.

BACKGROUND OF THE INVENTION

This invention relates in general to computer network security systems and in particular to systems and methods for detecting and preventing intrusion into a campus local area network by an unauthorized user.

As local area networks (LANS) continue to proliferate, and the number of personal computers (PCs) connected to LANs continue to grow at a rapid pace, network security becomes an ever increasing problem for network administrators. As the trend of deploying distributed LANs continues, this provides multiple access points to an enterprise's network. Each of these distributed access points, if not controlled, is a potential security risk to the network.

To further illustrate the demand for improved network security, an IDC report on network management, "LAN Management: The Pivotal Role of Intelligent Hubs", published in 1993, highlighted the importance of network security to LAN administrators. When asked the importance of improving management of specific LAN devices, 75% of the respondents stated network security is very important. When further asked about the growing importance of network security over the next three years, many respondents indicated that it would increase in importance.

More recently, a request for proposal from the U.S. Federal Reserve specified a requirement that a LAN hub must detect an unauthorized station at the port level and disable the port within a 10-second period. Although this requirement will stop an intruder, there is an inherent weakness in this solution in that it only isolates the security intrusion to the port of entry. The rest of the campus network is unaware of an attempted break-in. The detection of the unauthorized station and the disabling of the port is the first reaction to a security intrusion, but many significant enhancements can be made to provide a network-wide security mechanism. Where the above solution stops at the hub/port level, this invention provides significant enhancements to solving the problem of network security by presenting a system wide solution to detecting and preventing security intrusions in a campus LAN environment.

In today's environment, network administrators focus their attention on router management, hub management, server management, and switch management, with the goals of ensuring network up time and managing growth (capacity planning). Security is often an afterthought and at best administrators get security as a by-product of employing other device functions. For example, network administrators may set filters at router, switch, or bridge ports for performance improvements and implicitly realize some level of security as a side effect since the filters control the flow of frames to LAN segments.

The problem with using filters is that their primary focus is on performance improvements, by restricting the flow of certain types of network traffic to specified LAN segments. The filters do not indicate how many times the filter has actually been used and do not indicate a list of the media access control (MAC) addresses that have been filtered. Therefore, filters do not provide an adequate detection mechanism against break-in attempts.

Another security technique that is commonly employed in hubs is intrusion control. There are token ring and Ethernet managed hubs that allow a network administrator to define, by MAC address, one or more authorized users per hub port. If an unauthorized MAC address is detected at the hub port, then the port is automatically disabled. The problem with this solution is that prevention stops at the hub and no further action is taken once the security intrusion has been detected. This solution does not provide a network-centric, system-wide solution. It only provides a piecemeal solution for a particular type of network hardware namely, the token ring and Ethernet managed hubs. The result is a fragmented solution, where security may exist for some work groups that have managed hubs installed, but not for the entire campus network. At best, the security detection/prevention is localized to the hub level and no solution exists for a network-wide solution.

Other attempts to control LAN access have been done with software program products. For example, IBM Corporation's Lan Network Management (LNM) products LNM for OS2 and LNM for AIX both provide functions called access control to token ring LANs. There are several problems with these solutions. One problem with both of these solutions is that it takes a long time to detect that an unauthorized station has inserted into the ring. An intruder could have ample time to compromise the integrity of a LAN segment before LNM could take an appropriate action. Another problem with the LNM products is that once an unauthorized MAC address has been detected, LNM issues a remove ring station MAC frame. Although this MAC frame removes the station from the ring, it does not prevent the station from reinserting into the ring and potentially causing more damage. Because these products do not provide foolproof solutions, and significant security exposure still exists, they do not provide a viable solution to the problem of network security for campus LAN environments.

Thus, there is a need for a mechanism in the managed devices of a computer network that enables a comprehensive solution and that not only provides for detection of security intrusions, but also provides the proactive actions needed to stop the proliferation of security intrusions over the domain of an entire campus network.

SUMMARY OF THE INVENTION

It is, therefore, an object of the invention to provide an apparatus and method in a managed device for detecting and preventing security intrusions in a computer network.

It is another object of the invention to provide an apparatus and method in a managed hub for detecting and preventing security intrusions in a computer network.

Overall, this invention can be described in terms of the following procedures or phases: discovery, detection, prevention, hub enable, and security clear. During each of these phases, a series of frames are transmitted between the interconnect devices on a campus network. These frames are addressed to a group address (multicast address). This well known group address needs to be defined and reserved for the LAN security functions that are described herein. This group address will be referred to as LAN security feature group address throughout the rest of this description.

The campus LAN security feature relies on managed hubs discovering the interconnect devices in the campus LAN segment that support this LAN security feature. The term "LAN interconnect device" is used throughout this description to refer to LAN switches (token ring and Ethernet 10/100 Mbps), LAN bridges and routers. The managed hub maintains a list of authorized MAC addresses for each port in the managed hub. If the managed hub detects an unauthorized station connecting to the LAN, the hub disables the port and then transmits a security breach detected frame to the LAN security feature group address. Each of the LAN interconnect devices on the campus LAN segment copies the LAN security feature group address and performs the following steps: 1) set up filters to filter the intruding MAC address; 2) forward the LAN security feature group address to other segments attached to the LAN interconnect device; and 3) send an acknowledgement back to the managed hub indicating that the intruding address has been filtered at the LAN interconnect device. Once the managed hub receives acknowledgements from all of the interconnect devices in the campus LAN, the port where the security intrusion was detected is re-enabled for use. Another part of the invention provides a network management station with the capability to override any security filter that was set in the above process.

The following is a brief description of each phase in the preferred embodiment of the invention:

1. Discovery

In this phase, the managed hub determines the interconnect devices in the campus network that are capable of supporting the LAN security feature. The managed hub periodically sends a discovery frame to the LAN security feature group address. The managed hub then uses the responses to build and maintain a table of interconnect devices in the network that support the security feature.

2. Detection

In the detection phase, the managed hub compares the MAC addresses on each port against a list of authorized MAC addresses. If an unauthorized MAC address is detected, then the managed hub disables the port and notifies the other interconnect devices in the campus network by transmitting a security breach detected frame to the LAN security feature group address.

3. Prevention

The prevention phase is initiated when a LAN interconnect device receives the security breach detected frame. Once this frame is received, the LAN interconnect device sets up a filter to prevent frames with the intruding MAC address from flowing through this network device. The LAN interconnect device then forwards the security breach detected frame to the other LAN segments attached to the interconnect device. The LAN interconnect device also transmits a filter set frame back to the managed hub.

4. Hub Enable

The hub enable phase takes place when the managed hub has received all acknowledgements from the LAN interconnect devices in the campus network. When the acknowledgements have been received, the managed hub re-enables the port where the security intrusion occurred.

5. Security Clear Condition

In this phase, a network management station can remove a filter from a LAN interconnect device that was previously set in the prevention step.

BRIEF DESCRIPTION OF THE DRAWINGS

The invention will be described with respect to a preferred embodiment thereof which is further illustrated and described in the drawings.

FIG. 6 illustrates the structure of the Interconnect Device List (ICD).

FIG. 7 illustrates the structure of the Breach List.

FIG. 8 illustrates the structure of the Intrusion List.

DETAILED DESCRIPTION OF THE PREFERRED EMBODIMENT

The preferred embodiment of this invention uses the SNMP network management protocol, since SNMP is the most prevalent network management protocol in the industry and is the most widely deployed in campus networks. It should be noted that the concepts in this invention related to network management could also be applied to other network management protocols such as CMIP or SNA.

Figure 1:
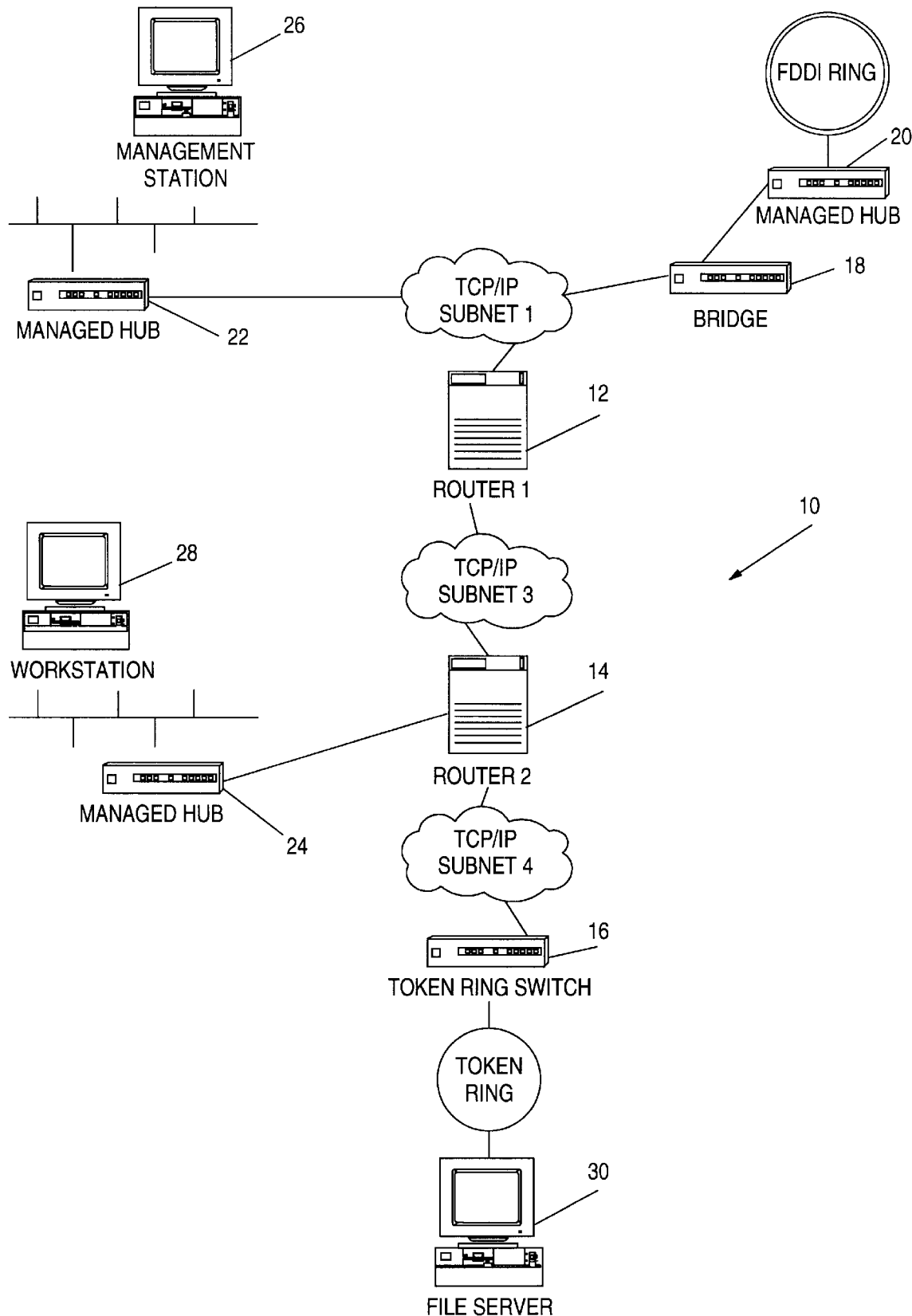
FIG. 1 is a block diagram of a campus network in which the present invention can be implemented.

FIG. 1 illustrates a typical campus network environment in which the present invention can be implemented. As shown in the figure, the campus network 10 contains interconnect devices, such as router 12, router 14, token ring switch 16, bridge 18, managed hubs 20, 22, 24, network management station 26, workstation 28 and file server 30.

Figure 2:
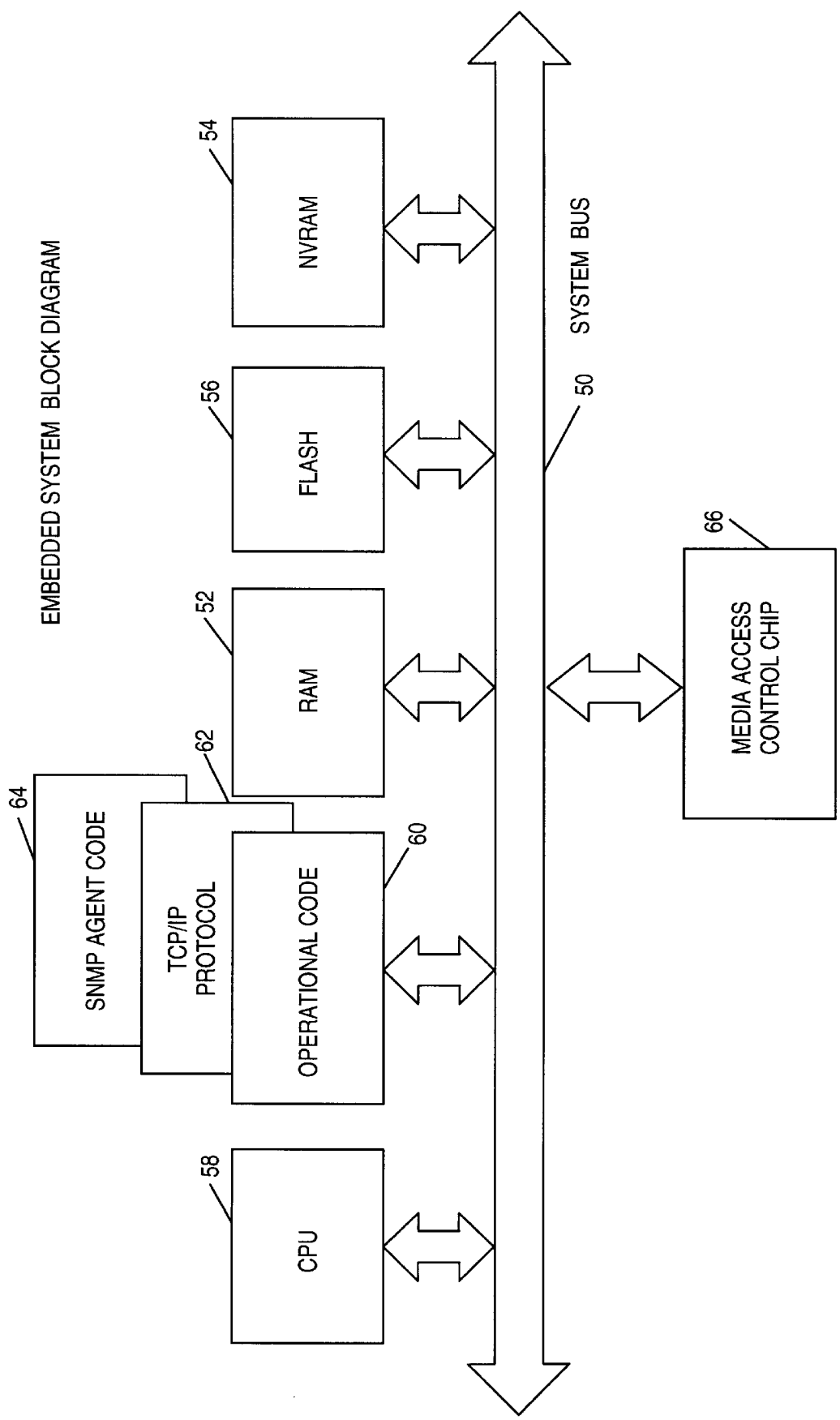
FIG. 2 is a component block diagram for an SNMP managed device.

The managed hubs and interconnect devices depicted in FIG. 1 are considered SNMP managed devices. The typical component block diagram for an SNMP managed device is illustrated in FIG. 2. A typical managed device is an embedded system that includes a system bus 50, random access memory (RAM) 52, NVRAM 54 to store configuration information, FLASH EPROM 56 to store the operational and boot-up code, a processor or CPU 58 to execute the code instructions, and a media access control (MAC) chip 66 that connects the device to the network 10. FIG. 2 also shows operational code 60, TCP/IP protocol stack 62 and SNMP agent code 64. In most instances, the operational code and the frame processing code execute in FLASH memory 56 or in RAM 52. The code that implements several phases in this invention is included as a part of the operational code (microcode or firmware) of the managed device. The MAC chip 66 copies the frames corresponding to the different phases into RAM 52 and notifies the processor 58, usually via an interrupt, that a frame is ready for processing. The operational code 60 handles the interrupt and processes the frame.

Figure 3:
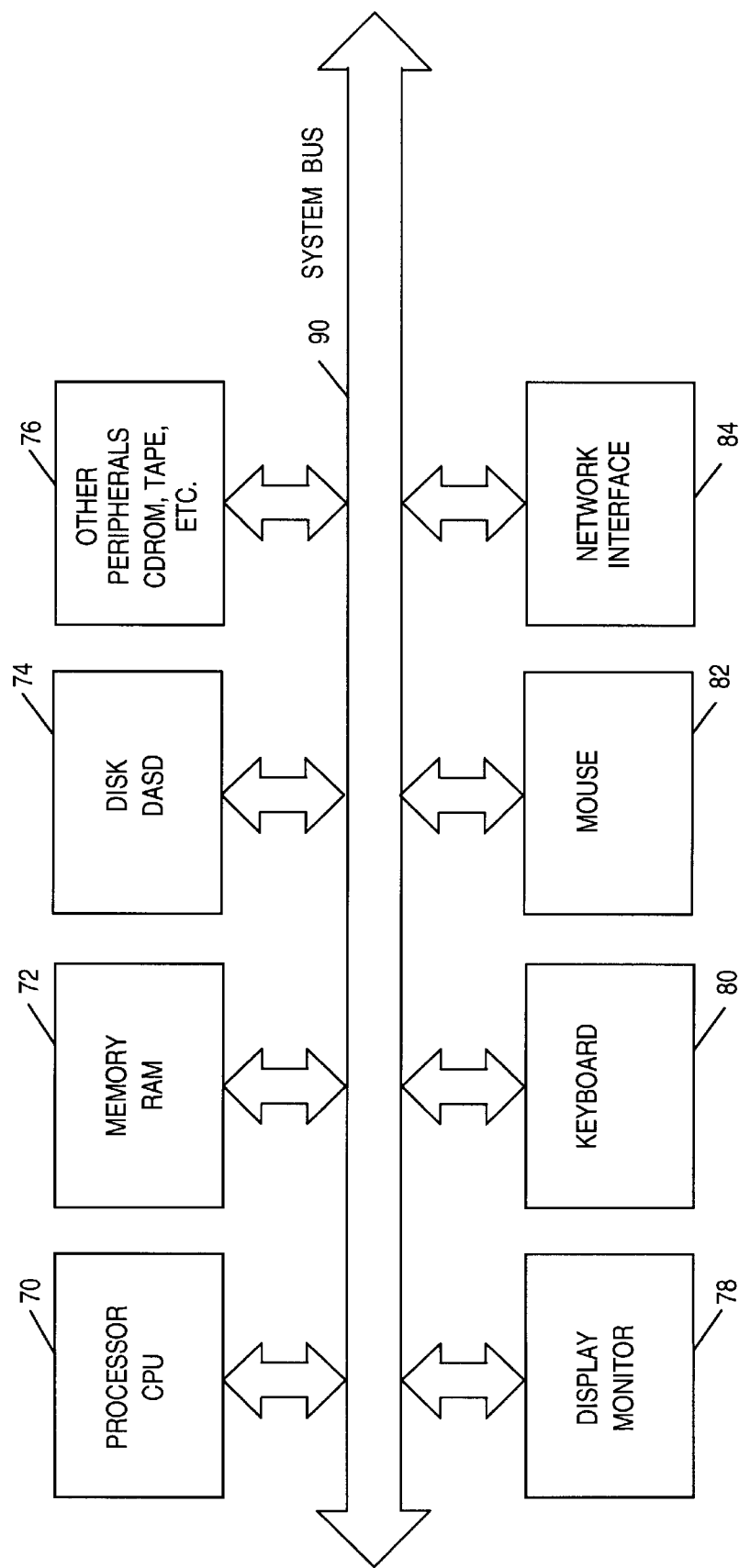
FIG. 3 is a component block diagram for a network management station.

FIG. 3 illustrates the typical component block diagram for a network management station such as that indicated by reference numeral 26 in FIG. 1. The network management station includes a processor 70, with a system bus 90 to which RAM 72, direct access storage device (DASD) 74, other peripherals 76, display monitor 78, keyboard 80, mouse 82 and network interface card 84 are connected.

Figure 4A:
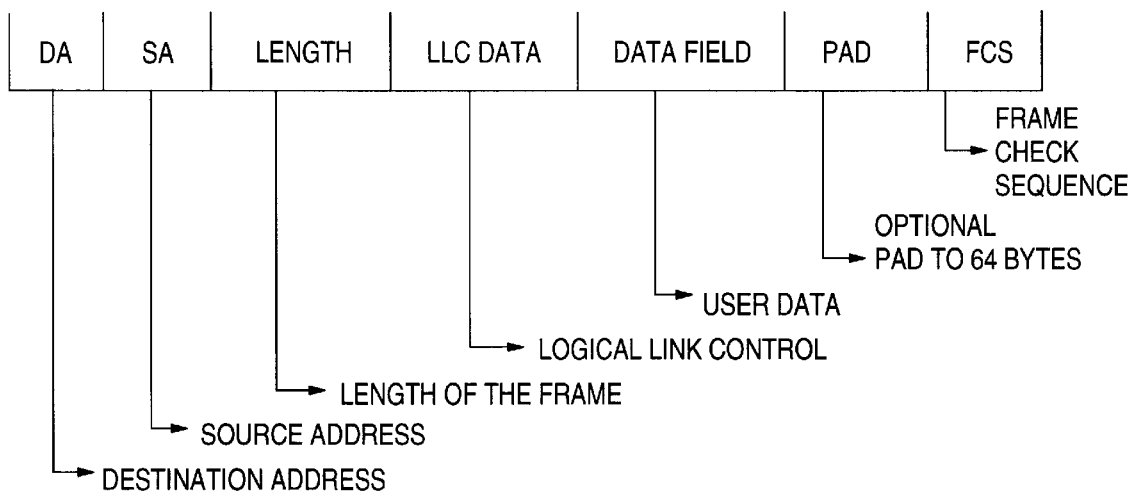
FIGS. 4A–4C show general frame formats for Ethernet and token ring frames.
Figure 4B:
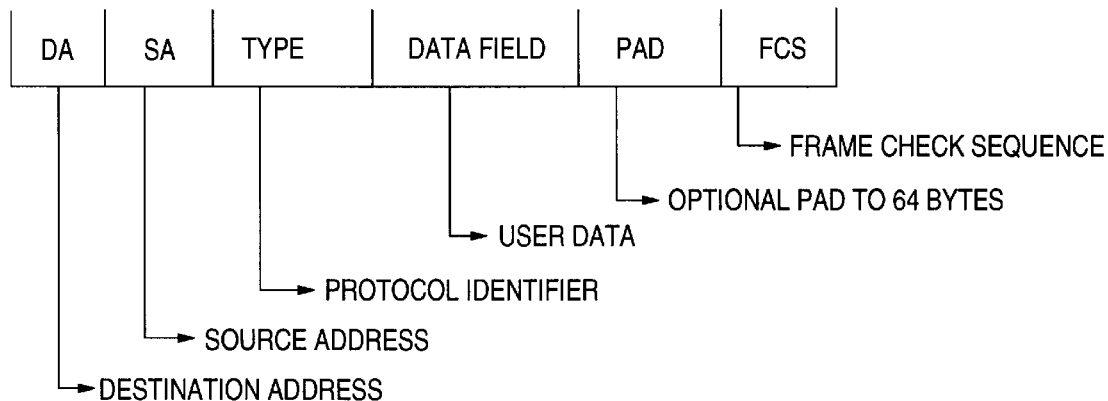
Figure 4C:
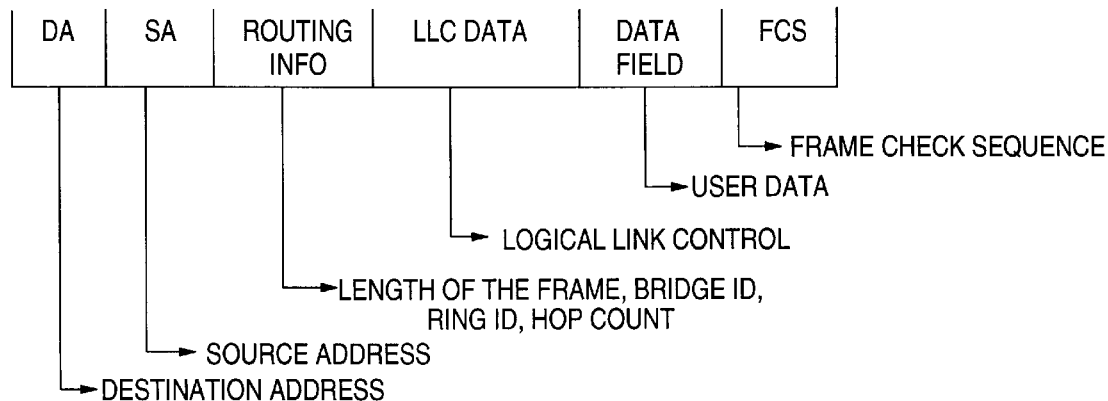

FIGS. 4A–4C show the general frame formats for Ethernet and token ring frames. The LAN security feature group address is placed in the destination address (DA) field of the discovery request, security breach detected and security clear condition (optionally) frames as discussed more fully below. The data field portion of each frame is used to pass the additional information related to this security feature.

The following describes the information that is included in the data fields of the Ethernet and token ring frame types to represent the different frames that are specific to the preferred embodiment of the invention.

Figure 5A:
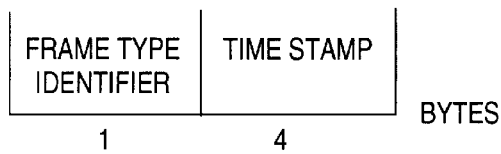
FIGS. 5A–5E show the information contained in the Ethernet and token ring frame data fields to represent the different frame types that are implemented in the preferred embodiment.

The discovery request frame shown in FIG. 5A is sent to the LAN security feature group address and the data field includes a one byte field which indicates that the frame type (frame type identifier x '01') is a discovery request frame. The time stamp field is the system time value when the discovery request frame is transmitted. It is used to correlate the discovery response frame with the discovery request frame.

Figure 5B:
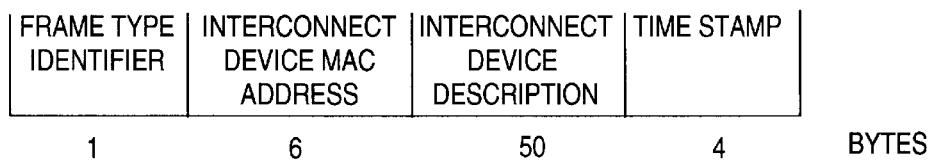

The discovery response frame shown in FIG. 5B is sent to the individual MAC address of the managed hub that initiated the request. The data field in this frame includes a one byte field which indicates that the frame type is a discovery response frame (frame type identifier x '02'), and also contains the MAC address of the LAN interconnect device sending the frame, a description of the LAN interconnect device (e.g., IBM 8272 Model 108 Token Ring Switch), and a time stamp that is used to correlate the discovery response frame with the discovery request frame.

Figure 5C:
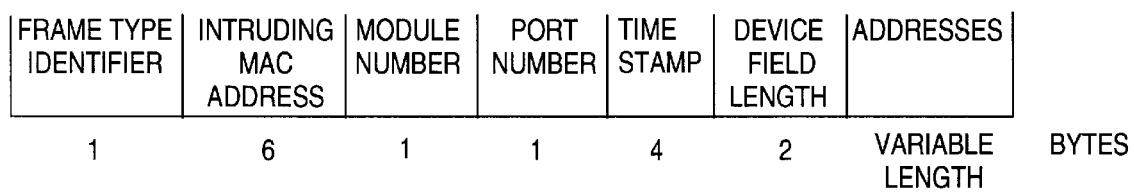

The security breach detected frame shown in FIG. 5C is sent to the LAN security feature group address and the data field includes a one byte field which indicates that the frame type is a security breach detected frame (frame type identifier x '03') and contains the MAC address that was detected as the security intruder. Other fields of this frame contain the module number and port number where the security breach was detected and the system time when the security breach was detected. When the time stamp value is used in combination with the intruding MAC address and module and port numbers, it forms an intrusion identifier as will be referred to subsequently. Following the time stamp are device field length indicating the length of the field that follows and address fields. The address field contains the list of addresses that have processed and forwarded the security breach detected frame. It starts with the originating MAC address of the managed hub. Each successive interconnect device that receives the frame, appends its MAC address to the end of this field and updates the device field length before it forwards the frame. It provides an audit trail or path that the security breach detected frame followed throughout the network. A network management station can monitor the progress of the security breach detected frame through information in the trap frames that it receives.

Figure 5D:
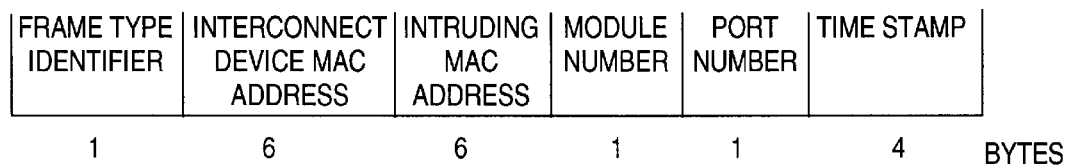

The filter set frame shown in FIG. 5D is sent to the individual MAC address of the managed hub that initiated the security intrusion condition. The data field includes a one byte field which indicates that the frame type is a filt er set frame (frame type identifier x '04') and contains the MAC address of the LAN interconnect device sending the frame. Other fields in this frame are the MAC address of the detected intrusion, the module and port number of the managed hub where the security intrusion was detected, and the time stamp representing the system time when the security breach was detected.

Figure 5E:
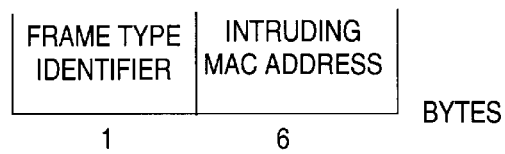

The security clear condition frame shown in FIG. 5E can be sent to the LAN security feature group address or to the individual MAC address of a LAN interconnect device. The data field includes a one byte field which indicates that the frame type is a security clear condition frame (frame type identifier x '05') and contains the intruding MAC address to remove as a filter.

Trap frames are sent to the network management station at various times depending upon the phase of the invention that is being performed. All trap frames have the same basic format with the information in each trap frame varying according to the phase.

In the discovery phase, traps are sent as a result of the managed hub deleting an interconnect device from the list of devices that are in the security domain of interconnect devices. The discovery trap frame contains the trap identifier (x '01'), the MAC address of the interconnect device and device description. This trap indicates that an interconnect device was removed from a managed hub interconnect device list because it did not respond to the managed hub with a discovery response frame within the allotted time period of the discovery window.

Traps sent in the detection phase indicate that the managed hub detected an intrusion on one of the hub ports. Information in this trap frame includes trap identifier (x '02'), the MAC address of the intruding device, the module and port number of the detected intrusion, and the time when the security intrusion was detected.

Traps sent in the prevention phase indicate that the interconnect device has completed the processing of a received security breach detected frame. This trap frame contains the trap identifier (x '03'), the MAC address of the intruding device, the module and port number of the detected intrusion, the time when the security breach was detected and a variable length address field. This last field contains a list of MAC addresses for all the devices that have processed the security breach detected frame. This information provides to the network management station the path that the security breach detected frame followed through the network.

Traps sent in the hub enable phase indicate that the managed hub has reenabled a hub port as a result of receiving filter set frames from all of the interconnect devices in the discovered security domain, i.e., all the discovered interconnect devices. This trap frame contains the trap identifier (x '04'), the MAC address of the intruding device, the module and port number of the detected intrusion, and the time when the security breach was detected.

For token ring networks, the information in the trap frames can be included in frames addressed to the functional address of the LAN manager. The LAN management frame format and defined functional address are specified in the IBM Token Ring Network Architecture (SC30-3374-02) publication.

For managed hubs, the authorized address list (AAL) controls which MAC addresses are allowed to connect to specified ports. Each entry in the AAL consists of two fields: port number and authorized address. The port number identifies a specific port on the hub; the authorized address field specifies the address or addresses that are allowed to connect to the port.

The AAL can be built by the network administrator as part of the configuration of the managed hub. The network administrator identifies the addresses that are allowed to connect to specific ports on the hub. After the initial configuration, the AAL can be updated in several ways. The network management station can add or delete entries in the AAL by sending SNMP management frames. Since most managed hubs provide a Telnet interface into the device to change configuration parameters, a Telnet session could be used to add or delete entries in the AAL. Also, since most managed hubs provide for the attachment of a local console over an RS232 serial port connection which can be used to change configuration parameters, a local console session can be used to add or delete entries in the AAL.

Alternatively, the AAL can be built dynamically through a learning process. Most managed hubs provide a mechanism in the hardware to capture the addresses of the stations that are attached to the ports of a hub. These learned addresses can be provided to the network management station as those stations authorized to access the hub. These learned addresses are then used as the AAL for the managed hub.

The discovery phase is initiated by each managed hub in the campus network. Its purpose is to determine the LAN interconnect devices in the campus LAN that support the LAN security feature. Each managed hub periodically transmits a discovery frame (FIG. 5A) to the LAN security feature group address. The managed hub then uses the information in the response frame (FIG. 5B) to build and maintain a list of all of the devices that support the LAN security feature. This list is referred to as the Interconnect Device List (ICD). The addresses in this list are used in the hub enable phase to correlate the reception of the filter set frame (FIG. 5D) with entries in the list. The managed hubs typically store these ICD lists in management information base (MIB) tables where they can be retrieved, upon request, from a network management station.

The discovery phase can also be used to provide an integrity check on the ICD list of devices supporting the LAN security feature. By periodically transmitting the discovery frame (FIG. 5A) to the LAN security feature group address, checks can then be made to ensure that all of the devices are still in the ICD security list. If any discrepancies are detected, e.g., if a station is removed from the list or added to the list, then an SNMP trap is sent to the network management station. This notification alerts the network administrator that a potential security exposure exists in the campus network. FIG. 6 illustrates the structure of the ICD list along with the information stored in the list for each discovered interconnect device. Other lists that are built and maintained in the detection and prevention phases are the Breach List shown in FIG. 7 and the Intrusion List shown in FIG. 8. Their use will be explained below in the description of the detection and prevention phases.

The detection phase operates at the managed hub level. Each port on the managed hub can be configured to hold one or more MAC addresses of users that are authorized to access the network. The managed hubs can be 10 or 100 Mbps Ethernet or token ring hubs. Current hub chipsets provide the capability to determine the last source MAC address that is seen on a port. When a station attempts to connect to a network, either by inserting into the token ring or by establishing a link state with an Ethernet hub, the last source address seen on the port is compared to the authorized list of MAC addresses that has been defined for this port. If the address is authorized then normal network operations occur. If the address is not authorized, then the managed hub performs the following actions:

1. disables the port;
2. sends an SNMP trap frame to the network management station;
3. sends an alert frame to the functional address of the LAN Manager (token ring); and
4. transmits a security breach detected frame (FIG. 5C) to the LAN security feature group address.

Additional variables in the SNMP trap provide information about the point of intrusion: e.g. the module id (in the case of stackable hubs), the port number, the network number (in cases where hubs have multiple backplanes), and a time stamp (sysUpTime) of when the intrusion was detected. SysUpTime is an SNMP MIB variable that represents the time (units of 0.01s) since the network management portion of the system was last re-initialized.

Some managed hubs support multiple backplanes or networks. In this case, the security breach detected frame is transmitted on all of the active backplanes/networks within the hub.

The well known group address needs to be defined and reserved for LAN security functions. The security breach detected frame (FIG. 5C) containing the MAC address of the station that intruded into the network is sent to the LAN security feature group address.

The prevention phase spans the network. Each interconnect device in the campus network is configured to copy frames addressed to the LAN security feature group address. Upon a security intrusion, the network interconnect devices copy the security breach detected frame (FIG. 5C) and perform the following functions:

1. set filters based on the intruder's MAC address.
2. transmit a security breach detected frame (FIG. 5C) to the LAN security feature group address.
3. send an SNMP trap frame to the network management station.
4. send an alert frame to the functional address of the LAN manager (token ring).
5. transmit filter set frame (FIG. 5D) to the MAC address of the hub that initiated the security breach process.

Setting filters by the network interconnect device prevents intrusion attempts with this MAC address originating elsewhere in the campus network from flowing through this interconnect device. This protects an enterprise's data on this segment of the network from any attacks via the intruder's MAC address.

The interconnect device extracts the intrusion identifier information from the security breach detected frame. If this is the first time the interconnect device has received a security breach detected frame with this intrusion identifier, the interconnect device adds this information to the Intrusion List, then checks to ensure the filter has been set for the intruding MAC address and resets, if required. The interconnect device then transmits the security breach detected frame on all ports except the port on which the security breach detected frame was received.

Sending the trap frame indicates that the filter has been set as a result of receiving the security breach detected frame. Likewise, sending the alert frame indicates that the filter has been set as a result of receiving the security breach detected frame.

The hub enable phase operates at the network level. The hub that initiates the security breach process receives the filter set frames from the interconnect devices in the campus network. The hub then waits to receive responses back from all of the interconnect devices that were determined in the discovery phase to be in the campus network. When all the interconnect devices in the network have responded to the hub with the filter set frame, the hub then re-enables the port for use and then sends a TRAP frame back to the network management station indicating that all filters have been set for the intruding MAC address. The network management station can optionally forward this information to a network management application such as IBM Corporation's NetView/390 product via an alert.

The security clear condition phase of this invention provides the capability for a network administrator to manually override, if necessary, one of the filters that has been set in the prevention phase. The network management station could globally clear, i.e., remove a filter from all LAN interconnect devices by transmitting the security clear condition frame (FIG. 5E) to the LAN security feature group address. The network management station could selectively clear, i.e., remove a filter from a LAN interconnect device by transmitting the security clear condition frame to the MAC address of the specific LAN interconnect device.

Figure 9:
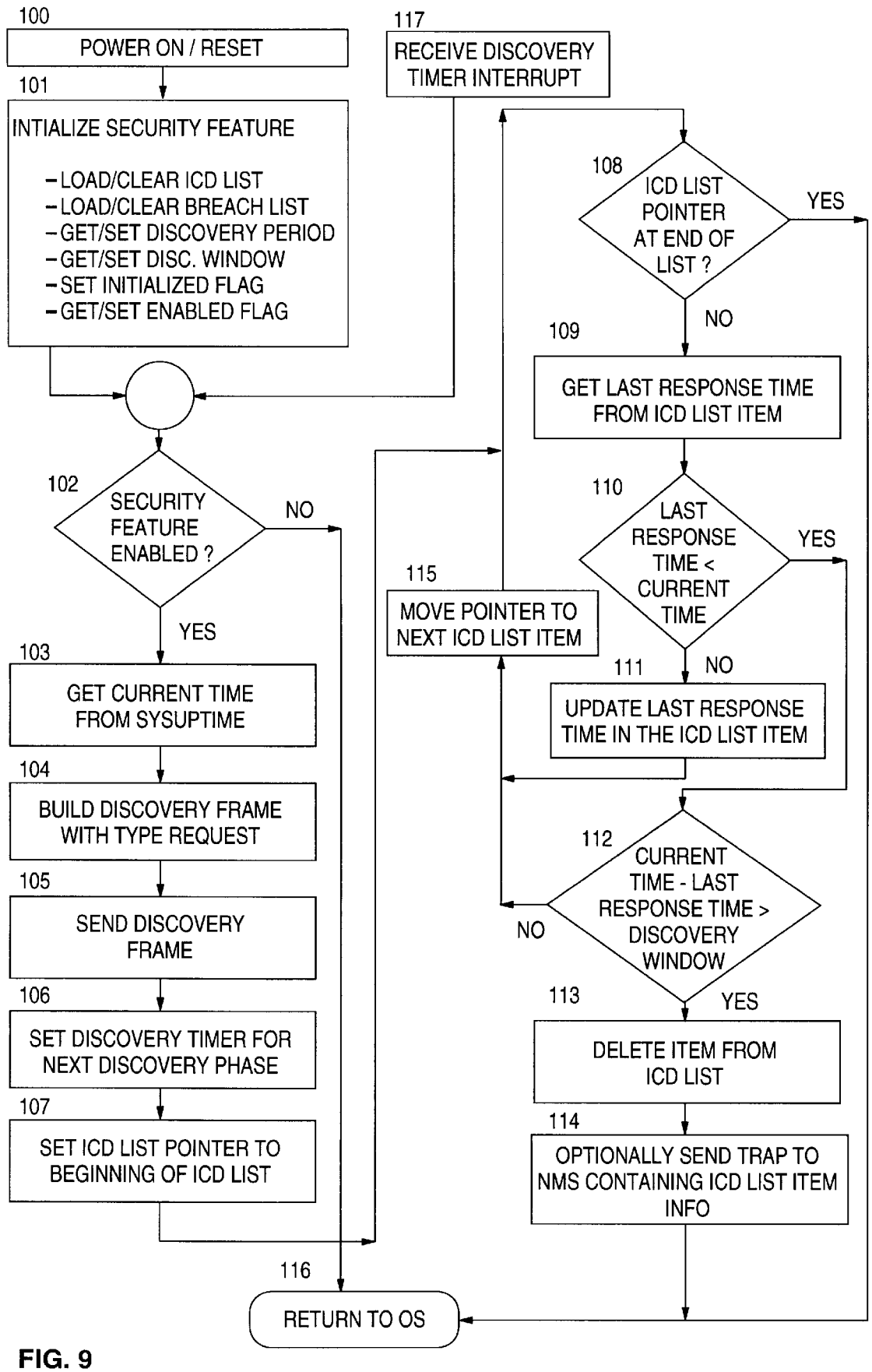
FIG. 9 is a flow chart of the processing that occurs in the managed hub to initiate the discovery phase of the invention.

FIGS. 9–15 are flow charts that illustrate the processing that occurs in the managed hub and in the interconnect devices during each phase of the invention. The code to implement the discovery phase of this invention runs within the managed hub and interconnect device as event driven threads within the real time OS embedded system. The flows in FIG. 9 depict the processing that occurs in the managed hub to initiate each discovery phase. This task manages the initialization and update of the Interconnect Device List and timing of the next iteration of the discovery phase. The following briefly describes each logic block in the figure.

Step 100: Entry to this task can be caused by a power on and/or reset. This would be one of many tasks that would run in response to this event.

Step 101: There are two lists, a period, a window, and two flags that are used by the managed hub in this invention. The ICD (Interconnect Device) List contains information on the devices found during the discovery phase. The Breach List contains information on intrusions recognized by the hub and in the process of being secured. The period is the time between discovery phases. The window is the time between when a discovery phase is initiated and when an Interconnect Device must respond before being assumed inaccessible due to network or device outage. One flag is an indication that initialization has completed. The other flag is an indication that the security feature is enabled. The lists, the period, the window and the enabled flag may be cleared or loaded from persistent memory. The initialized flag is set to True.

Step 102: Test for whether the security feature is enabled.

Step 103: Each managed hub maintains a MIB variable that is called SysUpTime. This is used as a time stamp for security feature frames.

Step 104: The discovery frame is built with the data field containing the type of the frame—Request.

Step 105: The frame is sent to the LAN security feature group address.

Step 106: The discovery phase is initiated periodically as an integrity check on the security feature coverage within the network. The period is adjustable to reflect variable path lengths or round-trip-times between a managed hub and interconnect devices. The period can be set via SNMP. The longer t he period, the less the integrity of the network coverage. The shorter the period, the higher the traffic rate required for the security feature.

Step 107: Set a pointer to the he ad of the list of ICD (Interconnect Device) List items. The pointer may point to an item or nothing if there are not items in the list. (The ICD List is a list of the interconnect devices that responded in a previous discovery phase). This part of the task is to update the Interconnect Device List by updating items as appropriate or deleting them as necessary.

Step 108: Does the pointer point to an item in the list or does it point beyond the end of the list?

Step 109: Each ICD List item has a time stamp from the last discovery response frame received from the device.

Step 110: Is the time for the item in the ICD List later than current time?

Step 111: If yes, the managed hub has reset or rolled over its SysUpTime since the last response from the ICD. Set the time in the ICD List item to current time.

Step 112: Is the difference between the current time and the last response time from the item greater than the discovery window?

Step 113: Assume the device is inaccessible due to network or device outage and purge the item from the ICD List. Also, decrement the outstanding filter set count on all the Breach List items.

Step 114: If there is a network management station (NMS) that is receiving traps from the managed hub and the traps are enabled, send a trap indicating that the interconnect device is no longer accessible. If there is an LNM for OS/2 station available and traps are enabled, send a trap to the LNM for OS/2 station.

Step 115: Move the ICD List pointer to the next item or to the end of the list if no more entries exist. This is for stepping through the entire list of ICD items.

Step 116: End the task and return to the embedded system OS.

Step 117: Enter this task due to a timer driven interrupt (set in step 106).

Figure 10:
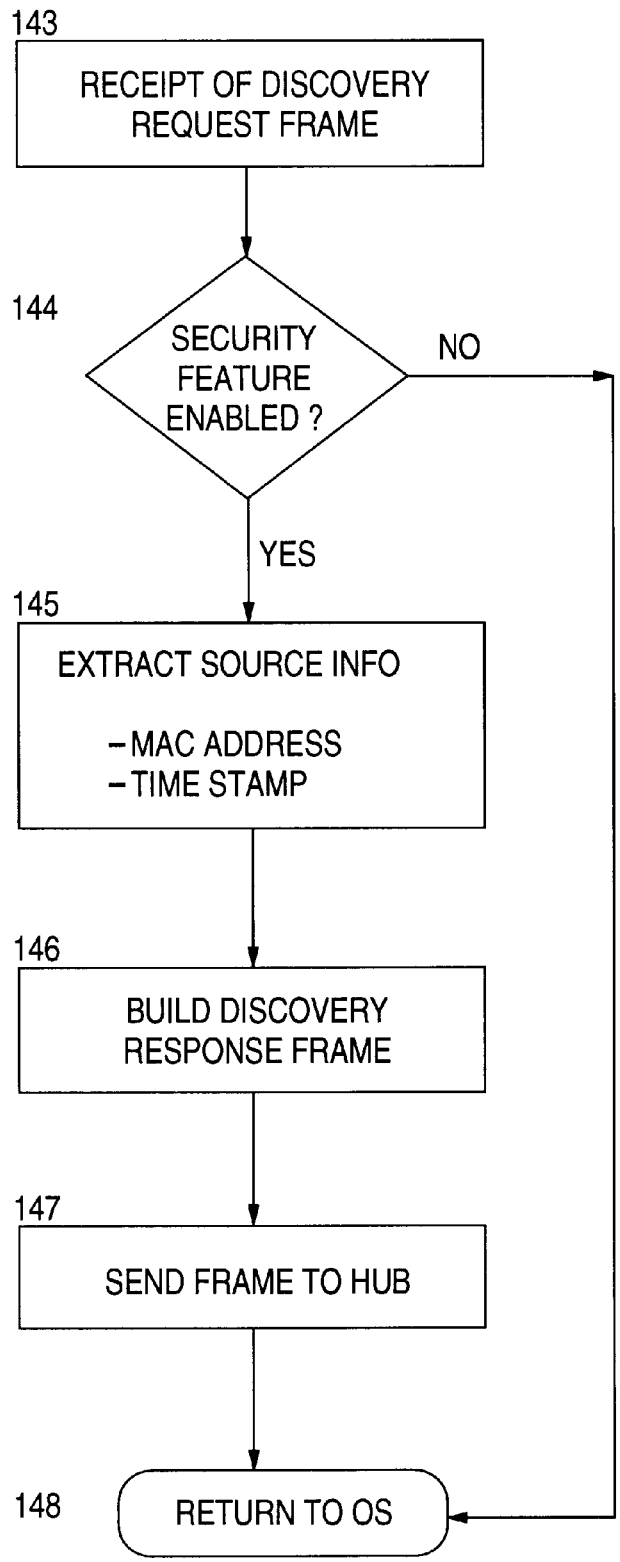
FIG. 10 is a flow chart of the processing that occurs in the interconnect device during the discovery phase of the invention.

The flows in FIG. 10 depict the processing that occurs in the interconnect devices during each iteration of the discovery phase. This task responds to the receipt of a discovery request frame by sending a discovery response frame. The following briefly describes each logic block in the figure.

Step 143: The task is initiated by the receipt of a discovery request frame.

Step 144: A check is made for whether the security feature is enabled. This determines if any additional processing is required.

Step 145: The source MAC address and time stamp are extracted for building the response.

Step 146: The discovery response frame is built using the information from the discovery request frame that was just received.

Step 147: The frame is sent to the originating managed hub.

Step 148: The task ends, returning control to the embedded OS.

Figure 11:
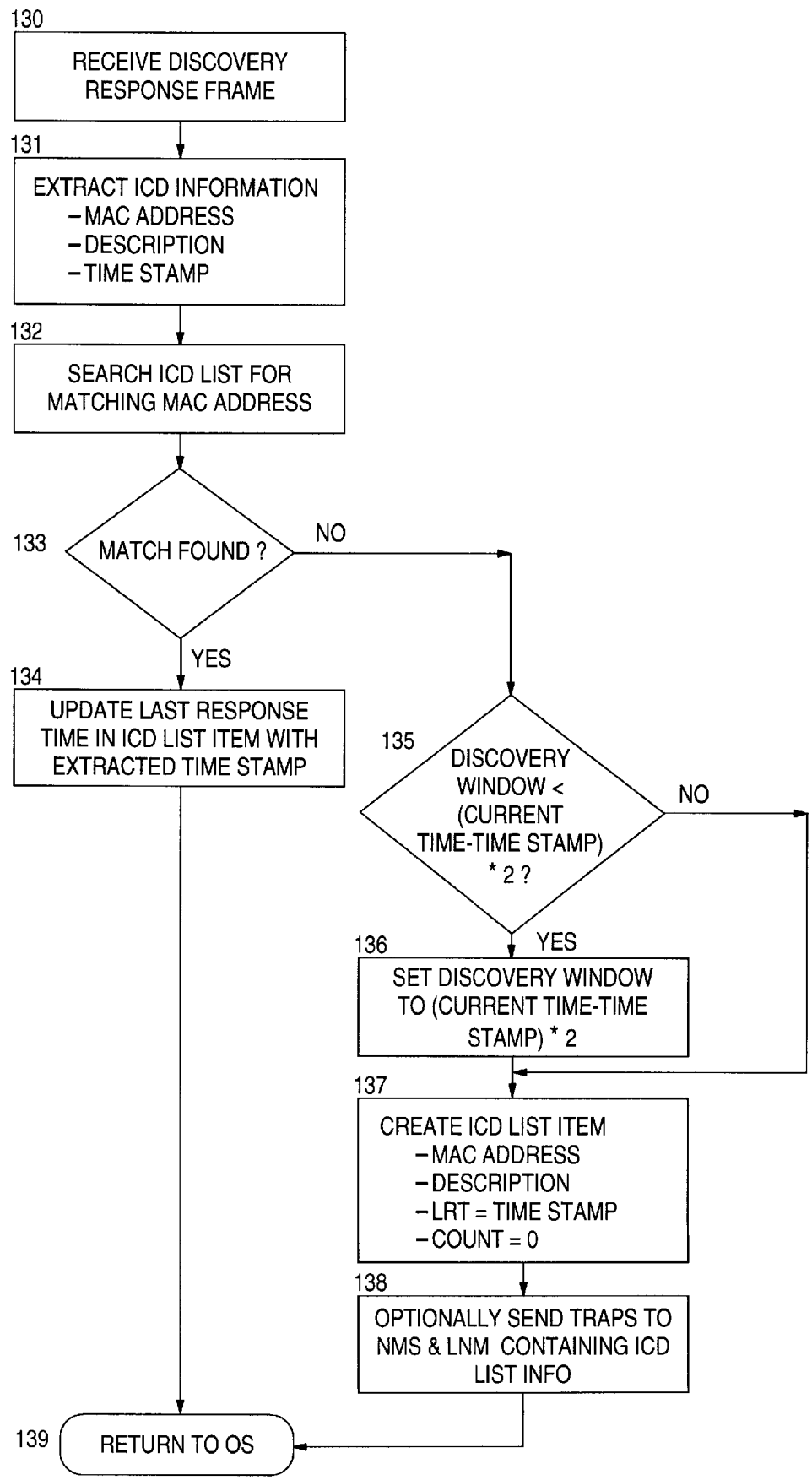
FIG. 11 is a flow chart of the processing that occurs in the managed hub during the discovery phase of the invention in response to the receipt of a discovery response frame.

The flows in FIG. 11 depict the processing that occurs in the managed hub in response to the receipt of a discovery response frame. This task maintains the state of this iteration of the discovery phase. The following briefly describes each logic block in the figure.

Step 130: The task is initiated in the managed hub by the receipt of a discovery response frame.

Step 131: The interconnect device information is extracted from the frame.

Step 132: The Interconnect Device List is searched for an item with a MAC address matching the source address of the discovery response frame.

Step 133: Has a match been found?

Step 134: If a match is found, update the last response time in the ICD List item with the time stamp that was extracted from the discovery response frame.

Step 135: If there is no match, assume that the device is not in the list because of either network/device outages or the device has just started utilizing the security feature. It is necessary to determine if the discovery window is still large enough. The round-trip-time is calculated, and multiplied by 2 to derive a potential discovery window. If this is larger than the current discovery window, the discovery window needs to be changed.

Step 136: Change the discovery window.

Step 137: Create a new Interconnect Device List item using the source address from the discovery response frame, the device description from the frame, and the time stamp from the frame. Add it to the list.

Step 138: Optionally send a trap to the network management station(s) and if this is a token ring, to the LAN manager functional address.

Step 139: The task ends, returning control to the embedded OS.

Figure 12:
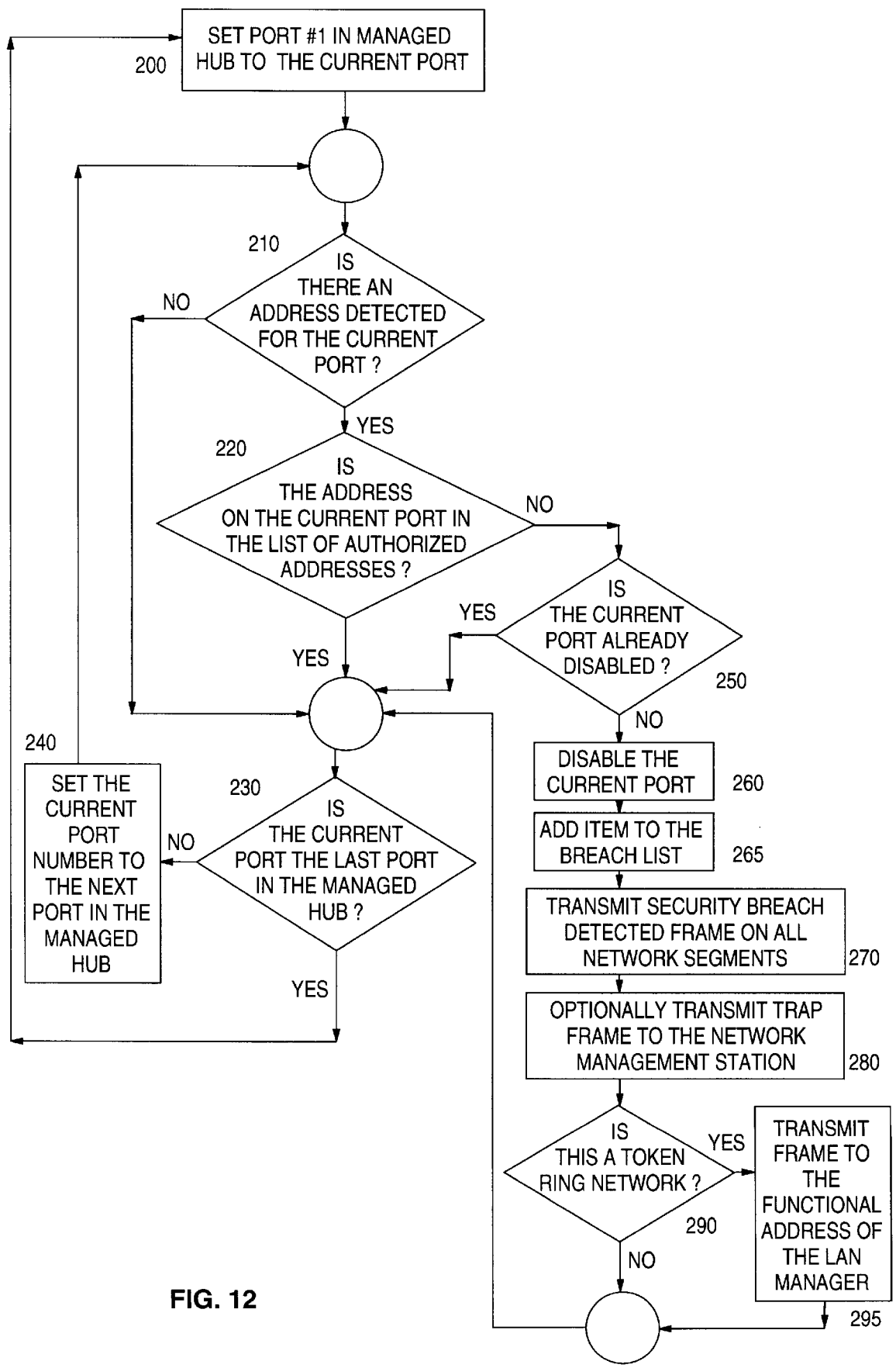
FIG. 12 is a flow chart of the processing that occurs in the managed hub during the detection phase of the invention.

The code to implement the detection phase of this invention runs as a separate task independent from the other tasks in the managed hub. The flows in FIG. 12 depict the processing that occurs during the dispatch of the detection phase task. This task simply checks all the ports in the hub to ensure that the station attached to the port has been authorized to establish a connection on this port. The AAL (Authorized Address List) defines which MAC addresses are allowed to connect to specific ports on the hub. The following briefly describes each logic block in the figure.

Step 200: This is the entry point for the detection phase task. Processing starts at port number 1 in the hub and continues until all of the ports in the hub have been processed.

Step 210: This step checks if a station is attached to the port in the hub. If a station is attached, then an address exists for the port. If an address is detected for the port (i.e., a station is attached to the port), then processing continues with step 220. if there is no address detected for this port (i.e., no station is attached), then processing continues with step 230.

Step 220: A check is made here to ensure that the address that has been detected on this port is in the list of authorized addresses. If the address detected on the port is authorized, then continue processing at step 230. If the address detected on the port is not in the authorized list, then processing continues at step 250.

Step 230: A check is made here to see if all of the ports in the hub have been processed. If all of the ports have been processed, then processing resumes at step 200 with the processing of port number 1. if this was not the last port and there are more ports to process, then processing continues at step 240.

Step 240: In this step, the next port in the hub is set up to be processed. Processing then continues at step 210.

Step 250: In this step a check is made to see if the port is already disabled. If the port is already disabled, then the port/network is already secure from intruders on this port. if the port is already disabled, then processing continues at step 230. If the port is enabled, processing then continues at step 260.

Step 260: In this step, the port is disabled. Processing then continues at step 265.

Step 265: In this step, an entry is added to the Breach List containing the following: MAC address that was detected as the intruder, the module and port number where the intrusion was detected, the time (sysUpTime) when the security breach was detected, and the outstanding filter set count which is set to the number of entries in the ICD list. Processing then continues at step 270.

Step 270: In this step, the security breach detected frame is transmitted on all network segments of the hub. The info field of the security breach detected frame includes the following: MAC Address of the intruder, module number, port number, time stamp (sysUpTime), the device field length initialized to 6 (bytes), the 6 byte MAC address of the managed hub. Processing then continues at step 280.

Step 280: In this step, a trap frame is optionally sent to the network management station. The trap frame includes the following information:

(a) trap identifier x '02';

This indicates that the managed hub detected in intrusion on one of the hub ports.

(b) MAC address of the intruding device;

(c) module number of the detected intrusion;

(d) port number of the detected intrusion;

(e) time when the security breach was detected;

Processing then continues at step 290.

Step 290: In this step, a check is made to see if this invention has been implemented in a token ring network. The token ring architecture defines a special functional address that is used by LAN management stations. Functional addresses are only used in token ring environments. If the invention is implemented in a token ring network, processing then continues at step 295. If the invention is implemented in a non-token ring network, processing then continues at step 230.

Step 295: in this step, a frame is sent to the functional address of the LAN manager with the information from step 280. Processing then continues at step 230.

Figure 13:
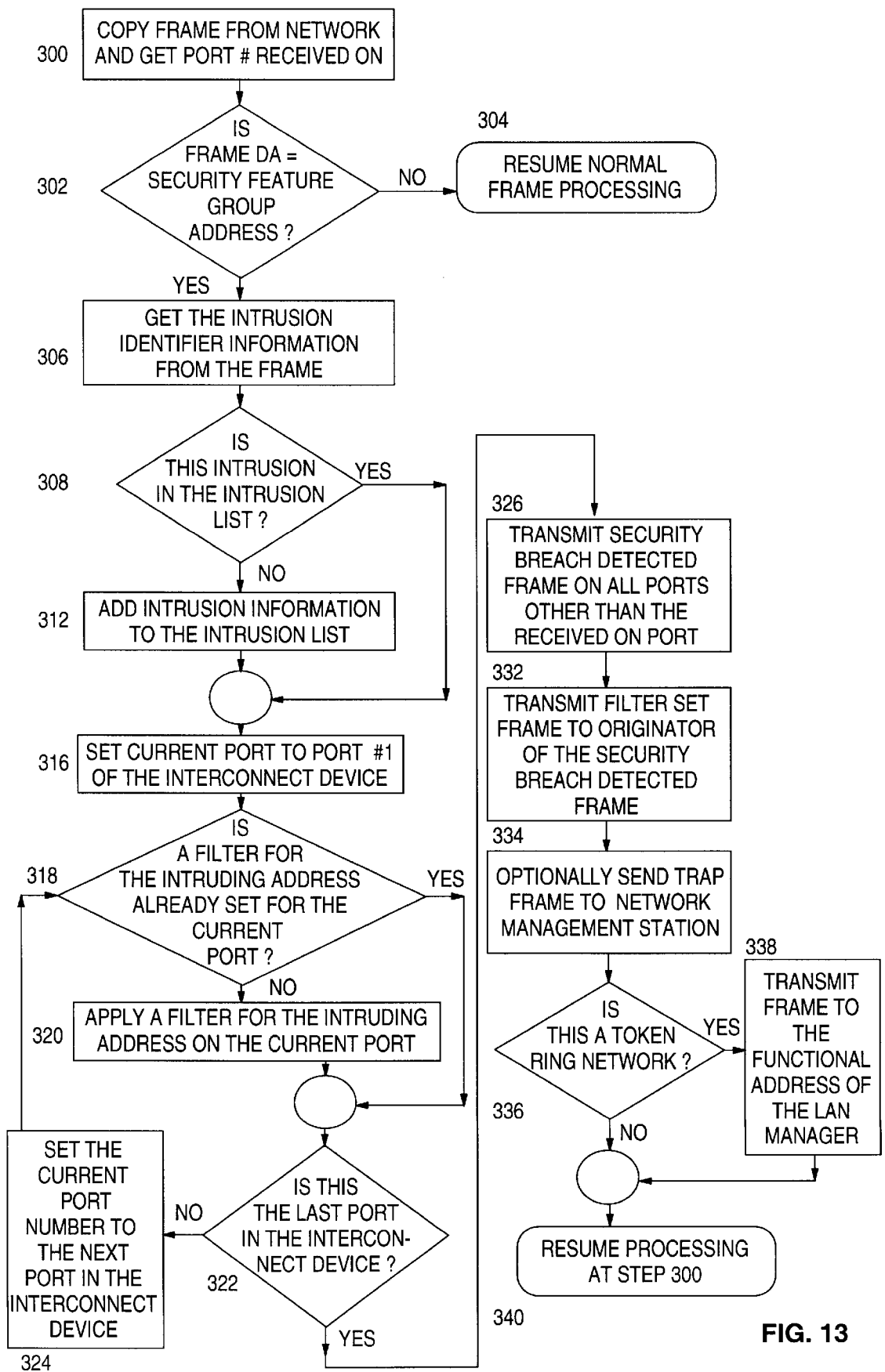
FIG. 13 is a flow chart of the processing that occurs in an interconnect device during the prevention phase of this invention.

FIG. 13 depicts the flows for the prevention phase of the invention. The prevention phase is implemented in the interconnect devices of the network. The following briefly describe each logic block in the figure.

Step 300: The processing is initiated when the interconnect device receives a frame from the network. The interconnect device copies the frame and saves the port number that the frame was received on. Processing then continues at step 302.

Step 302: In this step, the frame that wa s copied in step 300 is interrogated and a check is made to determine if the destination address of the frame is equal to the LAN security feature group address. if the received frame is addressed to the LAN security feature group address, then processing continues at step 306. Otherwise, the frame is of some other type and the processing continues with step 304.

Step 304: This step is encountered for all frame types other than the LAN security feature. The normal frame processing code of the interconnect device runs here.

Step 306: In this step, the intrusion identifier information is copied from the frame. The intrusion identifier consists of the following information:

(a) MAC address of the intruder;

(b) module number;

(c) port number;

(d) time stamp;

Processing then continues at step 308.

Step 308: In this step, a check is made to determine if the intrusion identifier is already in the Intrusion List of this same interconnect device. If yes, processing then continues at step 316. If no, processing then continues at step 312.

Step 312: In this step, the intrusion identifier information is added to the Intrusion List. Processing then continues at step 316.

Step 316: In this step, the current port of the interconnect device is set to port number 1. Processing then continues at step 318.

Step 318: In this step, a check is made to determine if the intruding MAC address is already filtered on the current port. If yes, processing then continues at step 322. If no, processing then continues at step 320.

Step 320: In this step, a filter is set for the intruding MAC address on the current port. Processing then continues at step 322.

Step 322: In this step a check is made to determine if the filter processing has been applied to all of the ports in the interconnect device. If all of the ports have been processed, processing then continues at step 326. If there are more ports to process, processing then continues at step 324.

Step 324: In this step, the current port is set to the next port in the interconnect device. Processing then continues at step 318.

Step 326: In this step, the security breach detected frame is propagated throughout the network. The interconnect device transmits the security breach detected frame on all ports other than the port the original frame was received on. (Reference step 300 where it is determined which port the frame was received on). Before transmitting the security breach detected frame, the ICD appends its MAC address to the addresses field of the frame and increments the device field length field of the frame by 6. This provides the audit trail or the path information for the security breach detected frame. Processing then continues at step 332.

Step 332: In this step, the interconnect device transmits the filter set frame to the originator of the security breach detected frame. The originator is determined by extracting the source address from the frame that was copied in step 306. Processing then continues at step 334.

Step 334: In this step, a trap frame is sent to the network management station. The trap frame includes the following information:

(a) trap identifier x '03';

This indicates that the interconnect device has completed the processing of a received security breach detected frame.

(b) MAC address of the intruding device;

(c) module number of the detected intrusion;

(d) port number of the detected intrusion;

(e) time when the security breach was detected;

(f) addresses field;

This is a variable length field that contains a list of all of the devices that have processed the security breach detected frame. This information provides to the network management station the path that the security breach detected frame followed throughout the network.

Processing then continues at step 336.

Step 336: In this step, a check is made to see if this invention has been implemented in a token ring network. The token ring architecture defines a special functional address that is used for LAN management stations. Functional addresses are only used in token ring environments. If the invention is implemented in a token ring network, processing then continues at step 338. If the invention is implemented in a non-token ring network, processing then continues at step 340.

Step 338: In this step, a frame containing the same information in the trap frame in step 334 is sent to the functional address of the LAN manager. Processing then continues at step 340.

Step 340: In this step, processing resumes again at step 300.

Figure 14:
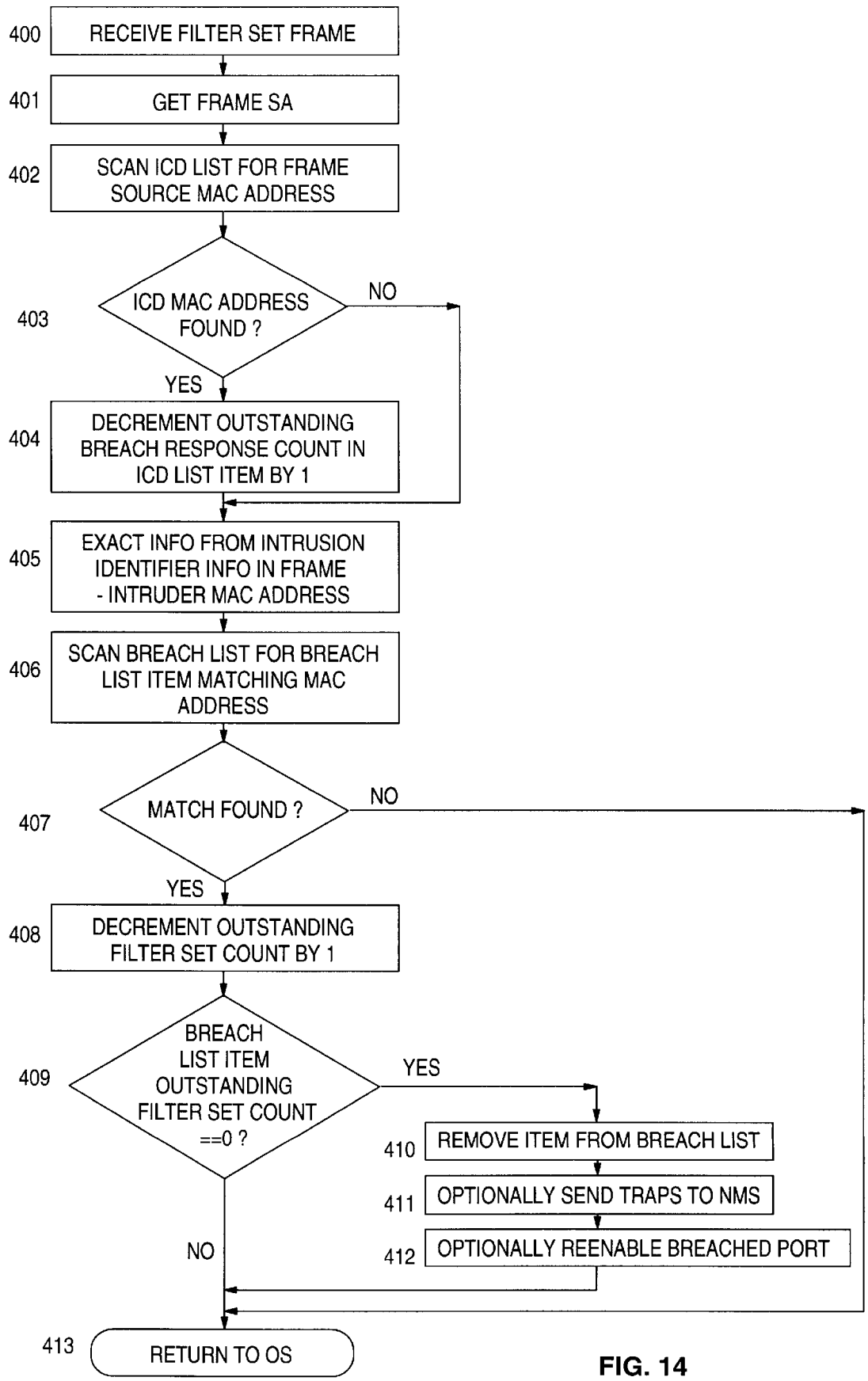
FIG. 14 is a flow chart of the processing that occurs in the managed hub during the hub enable phase of the invention.
Figure 15:
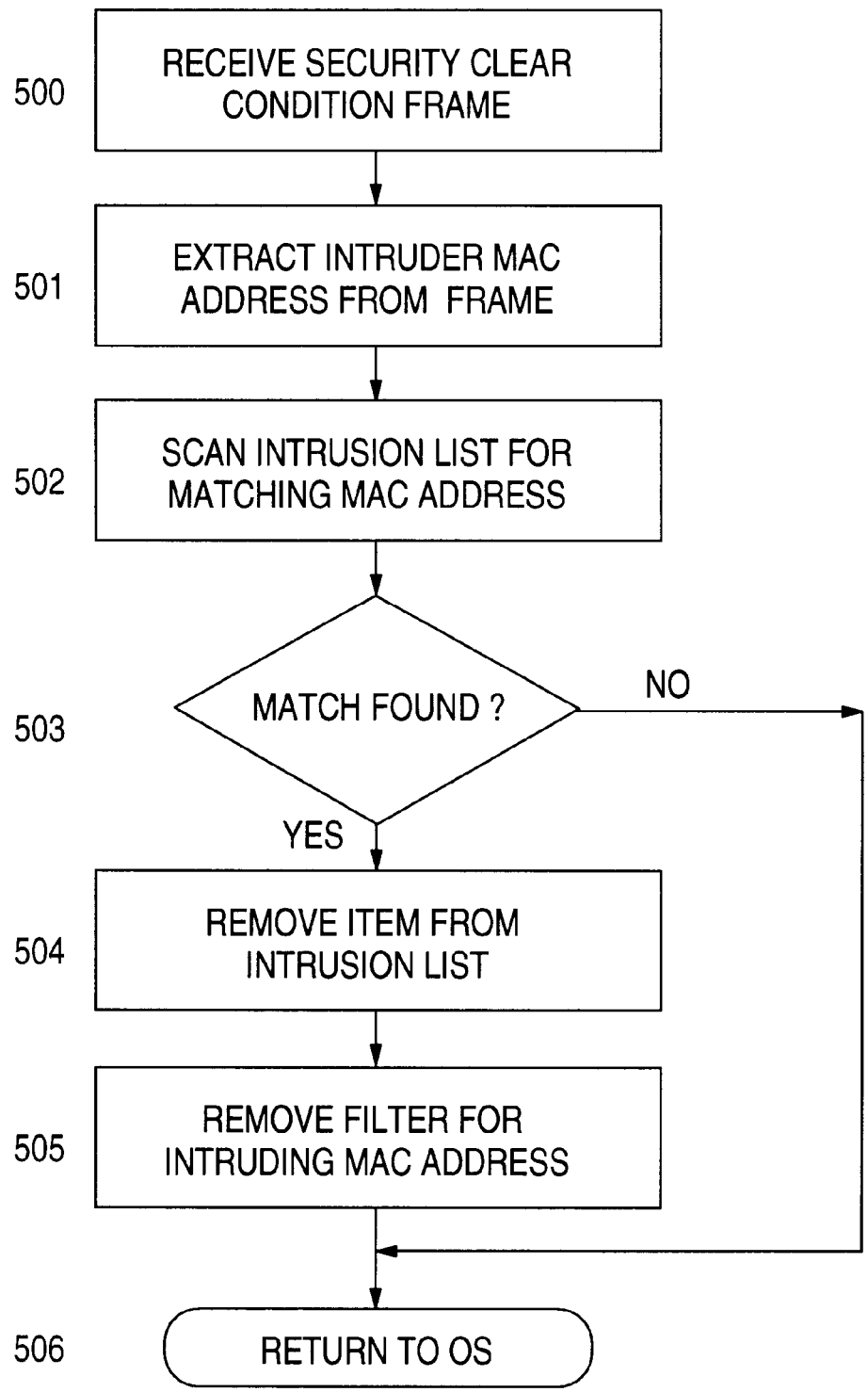
FIG. 15 is a flow chart of the processing that occurs in the interconnect devices in response to the receipt of a security clear condition frame.

The code to implement the hub enable phase of this invention runs within the managed hub as event driven threads within the real time OS embedded system. The flows in FIG. 14 depict the processing that occurs in the managed hub in response to receipt of each filter set frame. The task maintains the necessary lists of interconnect devices and breaches to complete the hub enable phase for each breach. The following briefly describes each logic block in the figure.

Step 400: The task is initiated in the managed hub by the receipt of a filter set frame.

Step 401: Get the source address of the frame for finding the associated ICD List item.

Step 402: The Interconnect Device List is scanned for an item with the same MAC address as the source address of the frame.

Step 403: Was a match found? If not, assume that the interconnect device is no longer accessible.

Step 404: If a match is found, decrement the outstanding breach response count in ICD List item by 1. This provides an up-to-date count of outstanding responses for each ICD.

Step 405: Extract intrusion identifier information from the frame.

Step 406: Scan the Breach List for an item with a matching intrusion identifier.

Step 407: Match found?

Step 408: If a match is found, decrement the outstanding filter set count by 1 in the matching Breach List item.

Step 409: Have all interconnect devices responded? Are all filters set?

Step 410: Since the intruder is now being filtered and has been removed from the network, remove the Breach List item.

Step 411: If there is a listening network management station(s), send a trap. If this is a token ring, send an alert to the LAN manager functional address.

Step 412: Optionally reenable the port. This is a policy decision. It may also reflect the likelihood of the intruder still attempting to intrude via this same port.

Step 413: End the task and return control to the embedded OS.

The code to implement the security clear condition phase of this invention runs within the interconnect devices as event driven threads within the real time OS embedded system. The flows in FIG. 15 define the processing that occurs in the interconnect devices in response to receipt of each security clear condition frame. The task updates the Intruder List of breaches and completes the security clear condition phase for each breach. The following briefly describes each logic block in the figure.

Step 500: The task is initiated in the interconnect device by the receipt of a security clear condition frame from a network management station.

Step 501: Extract the intruder MAC address from the security clear condition frame.

Step 502: Search the Intrusion List for a matching MAC address.

Step 503: Is there a match?

Step 504: If there is a match, remove the item from the Intrusion List.

Step 505: Remove filter for the intruding MAC address.

Step 506: End the task and return control to the embedded OS.

Two examples are given below to illustrate the actions that are performed by the managed hub and interconnect devices in an implementation of this invention in an operational campus environment. Referring again to FIG. 1, there is depicted a workstation 28, attached to an Ethernet hub 24, that is attempting to gain unauthorized access to a file server 30 that is located on a token ring segment. The security intrusion is detected by the managed Ethernet hub 24, since the MAC address of the workstation 28 is not authorized for this port in the hub. The managed hub 24 then disables the port and transmits the security breach detected frame to the LAN interconnect device 14 on this segment, which, in turn, forwards the security breach detected frame to LAN interconnect devices 12, 16 that are attached to subnet 3 and subnet 4, respectively. LAN interconnect device 12, in turn, forwards the security breach detected frame to LAN interconnect device 18. The LAN interconnect devices 12, 14, 16, 18 set filters on all ports in the device to prevent frames with the intruding MAC address from flowing through the interconnect device.

More specifically, the managed hub 24 disables the port and transmits the security breach detected frame to router 14. The managed hub 24 also sends a trap frame to the management station 26. Router 14 applies the intruder's MAC address as a filter on all of its ports and forwards the security breach detected frame on all of its ports, except the port the security breach detected frame was received on. Router 14 then sends a trap to the network management station 26 and sends a filter set frame back to the managed hub 24. Router 12 and the token ring switch 16 also receive the security breach detected frame and perform the same processing operations as defined above for router 14. The bridge 18 receives the security breach detected frame and performs the same processing operations as done by router 14. The managed hub 24 now correlates all of the received filter set frames with the interconnect devices 12, 14, 16, 18 that were discovered via the discovery request/response frames and reenables the port. The managed hub 24 then sends a trap to the management station 26 to indicate that the intruder's port has been reenabled.

Figure 16:
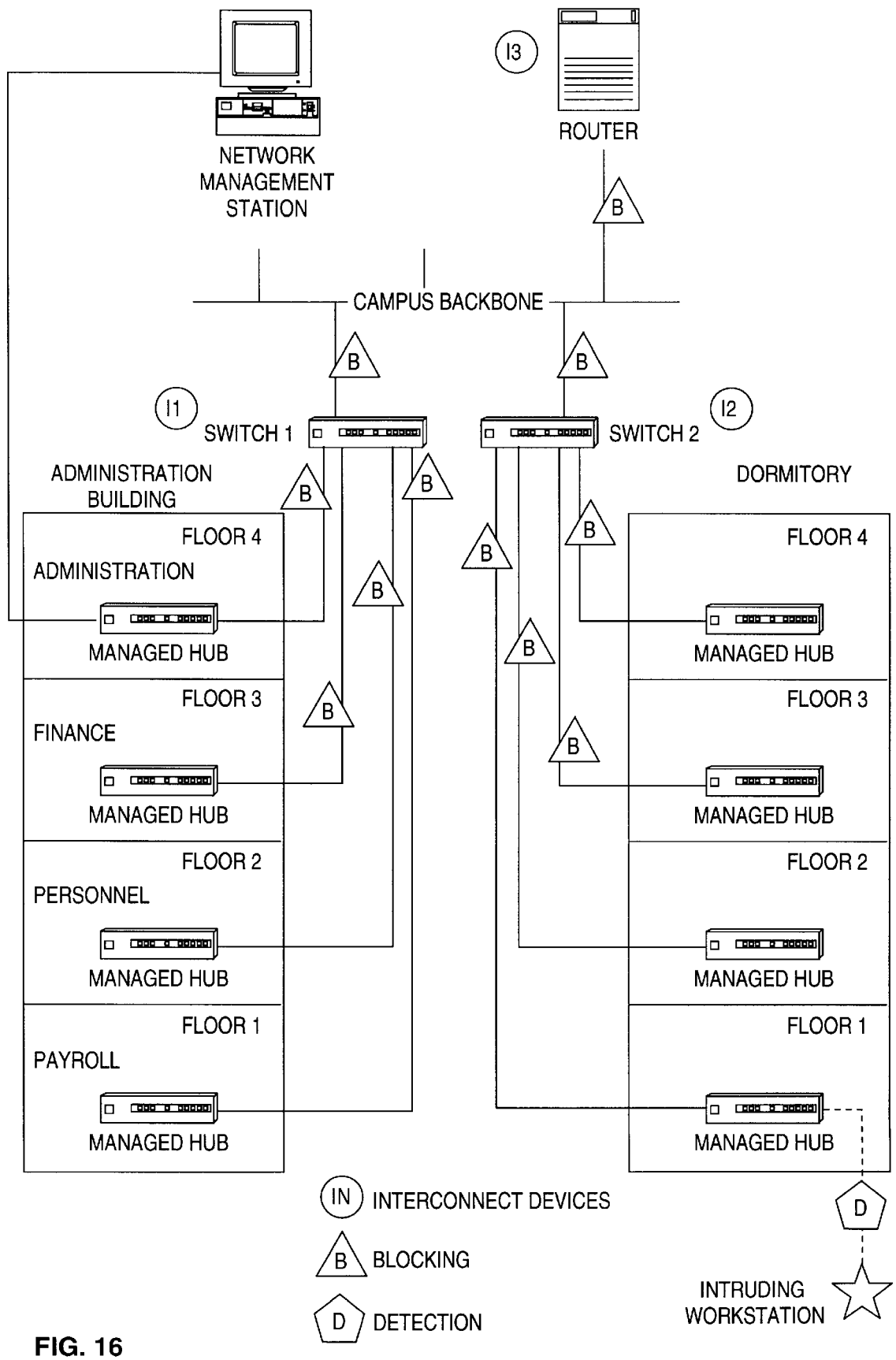
FIG. 16 is an example of the implementation of the invention in a campus LAN environment.

As a practical example of the implementation of this invention in a campus LAN environment, FIG. 16 depicts a university setting in which there is a managed hub on each floor of the buildings in a campus network. The network infrastructure consists of a pair of Ethernet switches attached to a campus backbone. Each Ethernet switch is also attached to a plurality of Ethernet managed hubs (one on each floor in each building). The figure shows a student dormitory that is attached to the same network that runs the university administration applications. There are obvious security concerns about students accessing the proprietary administrative information (i.e., grades, transcripts, payroll, accounts receivable/payable, etc.).

Figure 17:
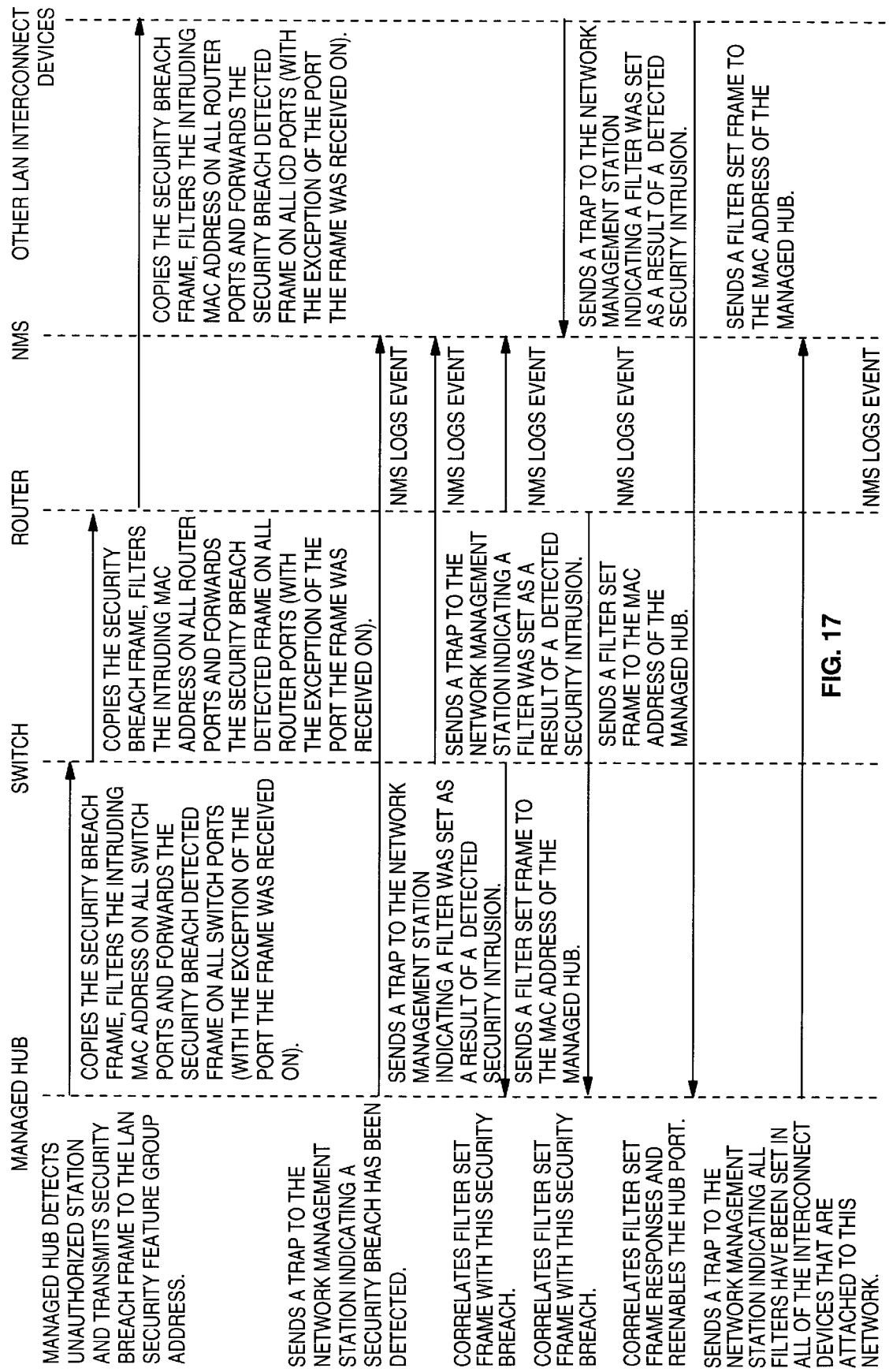
FIG. 17 is an example of the data flows corresponding to the example implementation in a campus LAN environment.

An intruder trying to access the network via one of the managed hub ports in the dormitory is stopped at the port of entry to the network and further access to the campus network is prevented by having the intruder's MAC address filtered on all LAN interconnect devices. The symbols containing a "B" in FIG. 16 indicate the points in the campus network where frames with the intruding MAC address are blocked from access to LAN segments by the setting of filters. The data flows corresponding to the example are shown in FIG. 17 and are self-explanatory.

For simplicity, this invention has used the term managed hub to refer to traditional token ring and Ethernet port concentration devices (e.g., IBM 8238, IBM 8224, IBM 8225, IBM 8250, IBM 8260). In reality, the functions of the managed hub can be extended to LAN switches (both token ring and Ethernet) where dedicated stations could be attached directly to the switch port. LAN switches would have to add the functionality of authorizing a set of MAC addresses that could attach to a switch port and detecting any unauthorized accesses to the switch port.

To describe the key aspects of this LAN security invention, it was easiest to illustrate with an implementation using managed hubs. In reality, many large enterprises use a combination of both managed hubs and unmanaged hubs throughout their networks. This invention is readily extendible and the security detection mechanism can easily be integrated into the function of a LAN bridge. The bridge would keep the list of authorized addresses for a given LAN segment where access to the LAN is via low cost unmanaged concentrators. The bridge would then detect any new addresses on the LAN segment and compare the addresses against the authorized list. If an unauthorized address was detected, the bridge would then set up filters for the intruding MAC address, and transmit the security breach detected frame to the other interconnect devices attached to the campus network. In this case, the intruder would be isolated to the LAN segment where the intrusion was first detected. This example shows that the composite function of the managed hub could be integrated into a LAN bridge and the bridge could control the security access for a large segment consisting of unmanaged concentrators.

Another special use of this invention involves the tasks of a network administrator. A key day-to-day task for most network administrators falls into the category of moves, adds, and changes to network configuration. In this invention, the network management station has complete awareness of all of the authorized users throughout the campus network. In the event that a security breach is detected, in the special case where an authorized user is trying to gain access through an unauthorized port, the network management station could detect this situation and automatically take the appropriate actions (i.e., remove filters from the interconnect devices since this is an authorized user). This type of action would assist administrators that work in dynamic environments where there are frequent moves, adds and changes.

The preferred embodiment of the invention has relied upon the detection of unauthorized MAC addresses by the managed hub. It can easily be modified to apply to the network layer (layer 3) or higher layers, in the Open System Interconnection (OSI) protocol stack and work with such well known network protocols as TCP/IP, IPX, HTTP, AppleTalk, DECnet and NETBIOS among others.

Currently, many LAN switches have custom application specific integrated circuits (ASICs) that are designed to detect or recognize frame patterns in hardware. These LAN switches use this frame type recognition capability primarily for frame forwarding based on the IP address and for placing switch ports in a virtual LAN (VLAN). In order to provide security protection at the network layer, it will be clear to one skilled in the art that the authorized address list (AAL) described herein can be extended to include IP addresses. The so-modified AAL, coupled with the LAN switch capability to detect IP addresses in a frame will enable implementation of the detection and prevention phases to support IP addresses. In the detection phase, the ASIC-based LAN switch can be used to obtain the IP address that is connected to a port. The detected IP address would then be compared to the authorized IP addresses in the AAL. If an unauthorized IP address is detected, the invention works as previously described with the disabling of the port and the transmission of the security breach detected frame. In the prevention phase, the interconnect devices are notified of intruding IP addresses and then apply filters for the intruding IP address.

The present invention can also be modified to operate at the application layer (layer 7) of the OSI protocol stack. Currently, several commercially available LAN switches, such as the model 8273 and model 8274 LAN switches available from IBM Corporation, provide a capability for a user-defined policy for creating a VLAN. This user-defined policy enables one to specify an offset into a frame and a value (pattern) to be used to identify the frame. Once the user-defined policy has been defined, the switch ASIC detects all frames matching the specified pattern and places them into a specific VLAN. Since the custom ASIC recognizes the user-defined pattern, it can be programmed to recognize portions of a frame that identify a specific application. This application pattern can then be used as the detection criteria in the invention and thus provide application layer security.

The present invention can be modified further to provide additional security by encryption of the data fields in the frames that are used to implement the inventive concepts described above. One of the most widely known and recognized encryption algorithms is the Data Encryption Standard (DES). The implementation of DES or other encryption algorithm to encrypt the data fields of frames described in this invention can ensure the privacy and integrity of the communication between managed hubs, interconnect devices and network management stations. Security protocols such as Secure Sockets Layer (SSL) utilizing public key encryption techniques are becoming standardized and can be used to further enhance the invention described herein.

While the invention has been particularly shown and described with reference to the particular embodiments thereof, it will be understood by those skilled in the art that various changes in form and detail may be made therein without departing from the spirit and scope of the invention.

Having thus described our invention, what we claim and desire to secure as Letters Patent is as follows:

1. A method for providing security against intrusion in a managed device of a computer network having at least one interconnect device, said method comprising the steps of:
   discovering each of said interconnect devices that is enabled to provide network security;
   detecting an unauthorized address on a first port of said managed device and disabling said first port;
   notifying each of said security-enabled interconnect devices that the unauthorized address has been detected on said first port; and
   reenabling said first port after each of said security-enabled interconnect devices has notified said managed device that a filter has been set to prevent frames with the unauthorized address from flowing through said each security-enabled interconnect device.

2. The method for providing security against intrusion of claim 1 wherein said managed device is a managed hub.

3. The method for providing security against intrusion of claim 1 wherein said managed device is a switch.

4. The method for providing security against intrusion of claim 1 wherein said computer network includes a local area network.

5. The method for providing security against intrusion of claim 1 further comprising the steps of building and maintaining an authorized address list of addresses that are allowed to connect to each port in said managed device.

6. The method for providing security against intrusion of claim 5 wherein each entry in said authorized address list includes a port number and an authorized address.

7. The method for providing security against intrusion of claim 1 wherein said discovering step includes the steps of:
   transmitting a discovery request frame, said discovery request frame having a security feature group address;
   receiving a discovery response frame from each of said security-enabled interconnect devices;
   building and maintaining an interconnect device list of said security-enabled interconnect devices that transmitted said discovery response frame back to said managed device.

8. The method for providing security against intrusion of claim 7 wherein each entry in said interconnect device list includes an address of the security-enabled interconnect device that sent the discovery response frame and a time stamp extracted from said discovery response frame.

9. The method for providing security against intrusion of claim 6 wherein said detecting step includes the steps of:
   comparing, for each port, a source address of a station attempting to connect to said port with the authorized address list of addresses for said port and determining whether said source address is on said authorized address list.

10. The method for providing security against intrusion of claim 7 wherein following said disabling step said method further includes:
    sending a trap frame to a network management station indicating that an intrusion has been detected on said first port; and
    transmitting a security breach detected frame having said security feature group address to said security-enabled interconnect devices that have entries in said interconnect device list.

11. The method for providing security against intrusion of claim 10 wherein said security breach detected frame includes a source address of an unauthorized station, the port number at which the intrusion occurred, and a time stamp representing the time at which the unauthorized station was detected.

12. The method for providing security against intrusion of claim 11 wherein each of said security-enabled interconnect devices transmits a filter set frame to said managed device that includes the address of said each security-enabled interconnect device sending said filter set frame, the source address of said unauthorized station, the port number at which the intrusion occurred, and a time stamp representing the time at which the unauthorized station was detected.

13. The method for providing security against intrusion of claim 1 wherein following said reenabling step said managed device sends a trap frame to a network management station indicating that said filtering step has been completed.

14. An apparatus for providing security against intrusion in a managed device of a computer network having at least one interconnect device, said apparatus comprising:
    means for discovering each of said interconnect devices that is enabled to provide network security;
    means for detecting an unauthorized address on a first port of said managed device and means for disabling said first port;
    means for notifying each of said security-enabled interconnect devices that the unauthorized address has been detected on said first port; and means for reenabling said first port after each of said security-enabled interconnect devices has notified said managed device that a filter has been set to prevent frames having the unauthorized address from flowing through said each security-enabled interconnect device.

15. The apparatus for providing security against intrusion of claim 14 wherein said managed device is a managed hub.

16. The apparatus for providing security against intrusion of claim 14 wherein said managed device is a switch.

17. The apparatus for providing security against intrusion of claim 14 further comprising means for building and maintaining an authorized address list of addresses that are allowed to connect to each port in said managed device.

18. The apparatus for providing security against intrusion of claim 17 wherein each entry in said authorized address list includes a port number and an authorized address.

19. The apparatus for providing security against intrusion of claim 14 wherein said means for discovering includes:
   means for transmitting a discovery request frame, said discovery request frame having a security feature group address;
   means for receiving a discovery response frame from each of said security-enabled interconnect devices;
   means for building and maintaining an interconnect device list of said security-enabled interconnect devices that transmitted said discovery response frame back to said managed device.

20. The apparatus for providing security against intrusion of claim 19 wherein each entry in said interconnect device list includes an address of the security-enabled interconnect device that sent the discovery response frame and a time stamp extracted from said discovery response frame.

21. The apparatus for providing security against intrusion of claim 18 wherein said means for detecting includes:
   means for comparing, for each port, a source address of a station attempting to connect to said port with the authorized address list of addresses for said port and means for determining whether said source address is on said authorized address list.

22. The apparatus for providing security against intrusion of claim 19 further including:
   means for sending a trap frame to a network management station indicating that an intrusion has been detected on said first port; and
   means for transmitting a security breach detected frame having said security feature group address to said security-enabled interconnect devices that have entries in said interconnect device list.

23. The apparatus for providing security against intrusion of claim 22 wherein said security breach detected frame includes a source address of an unauthorized station, the port number at which the intrusion occurred, and a time stamp representing the time at which the unauthorized station was detected.

24. The apparatus for providing security against intrusion of claim 23 wherein each of said security-enabled interconnect devices transmits a filter set frame to said managed device that includes the address of said each security-enabled interconnect device sending said filter set frame, the source address of said unauthorized station, the port number at which the intrusion occurred, and a time stamp representing the time at which the unauthorized station was detected.

25. The apparatus for providing security against intrusion of claim 14 wherein said managed device further comprises means for sending a trap frame to a network management station indicating that said filter has been set at each of said security-enabled interconnect devices.

26. A method for providing security against intrusion in a managed hub of a computer network having at least one interconnect device, said method comprising the steps of:
   building and maintaining an authorized address list of addresses that are allowed to connect to each port;
   discovering each interconnect device that is enabled to provide network security;
   detecting an unauthorized address on a first port and disabling said first port;
   notifying each security-enabled interconnect device that the unauthorized address has been detected on said first port; and
   reenabling said first port after each security-enabled interconnect device has notified said managed hub that a filter has been set to prevent frames with the unauthorized address from flowing through each security-enabled interconnect device.

27. The method for providing security against intrusion of claim 26 wherein said discovering step includes the steps of:
   transmitting a discovery request frame, said discovery request frame having a security feature group address;
   receiving a discovery response frame from each security-enabled interconnect device;
   building and maintaining an interconnect device list of each security-enabled interconnect device that transmitted said discovery response frame back to said managed hub.

28. The method for providing security against intrusion of claim 27 wherein said detecting step includes the steps of:
   comparing, for each port, a source address of a station attempting to connect to said port with an authorized address list of addresses for said port and determining whether said source address is on said authorized address list.

29. The method for providing security against intrusion of claim 27 wherein following said disabling step said method further includes:
   sending a trap frame to a network management station indicating that an intrusion has been detected on said first port; and
   transmitting a security breach detected frame having said security feature group address to each security-enabled interconnect device that has an entry in said interconnect device list.

30. The method for providing security against intrusion of claim 26 wherein following said reenabling step said managed hub sends a trap frame to a network management station indicating that said filtering step has been completed.

31. An apparatus for providing security against intrusion in a managed hub of a computer network having at least one interconnect device, said apparatus comprising:
   means for building and maintaining an authorized address list of addresses that are allowed to connect to each port;
   means for discovering each interconnect device that is enabled to provide network security;
   means for detecting an unauthorized address on a first port and means for disabling said first port;
   means for notifying each security-enabled interconnect device that the unauthorized address has been detected on said first port; and
   means for reenabling said first port after each security-enabled interconnect device has notified said managed hub that a filter has been set to prevent frames with the unauthorized address from flowing through each security-enabled interconnect device.

32. The apparatus for providing security against intrusion of claim 31 wherein said means for discovering includes:

means for transmitting a discovery request frame, said discovery request frame having a security feature group address;

means for receiving a discovery response frame from each security-enabled interconnect device;

means for building and maintaining an interconnect device list of each security-enabled interconnect device that transmitted said discovery response frame back to said managed hub.

33. The apparatus for providing security against intrusion of claim 32 wherein said means for detecting includes:

means for comparing, for each port, a source address of a station attempting to connect to said port with an authorized address list of addresses for said port and means for determining whether said source address is on said authorized address list.

34. The apparatus for providing security against intrusion of claim 32 further including:

means for sending a trap frame to a network management station indicating that an intrusion has been detected on said first port; and means for transmitting a security breach detected frame having said security feature group address to each security-enabled interconnect device that has an entry in said interconnect device list.

35. The apparatus for providing security against intrusion of claim 31 wherein said managed hub further comprises means for sending a trap frame to a network management station indicating that said filter has been set at each security-enabled interconnect device.

* * * * *